O. H. ENSIGN.
ART OF AND MEANS FOR LIQUID FUEL CONVERSION.
APPLICATION FILED DEC. 29, 1917.

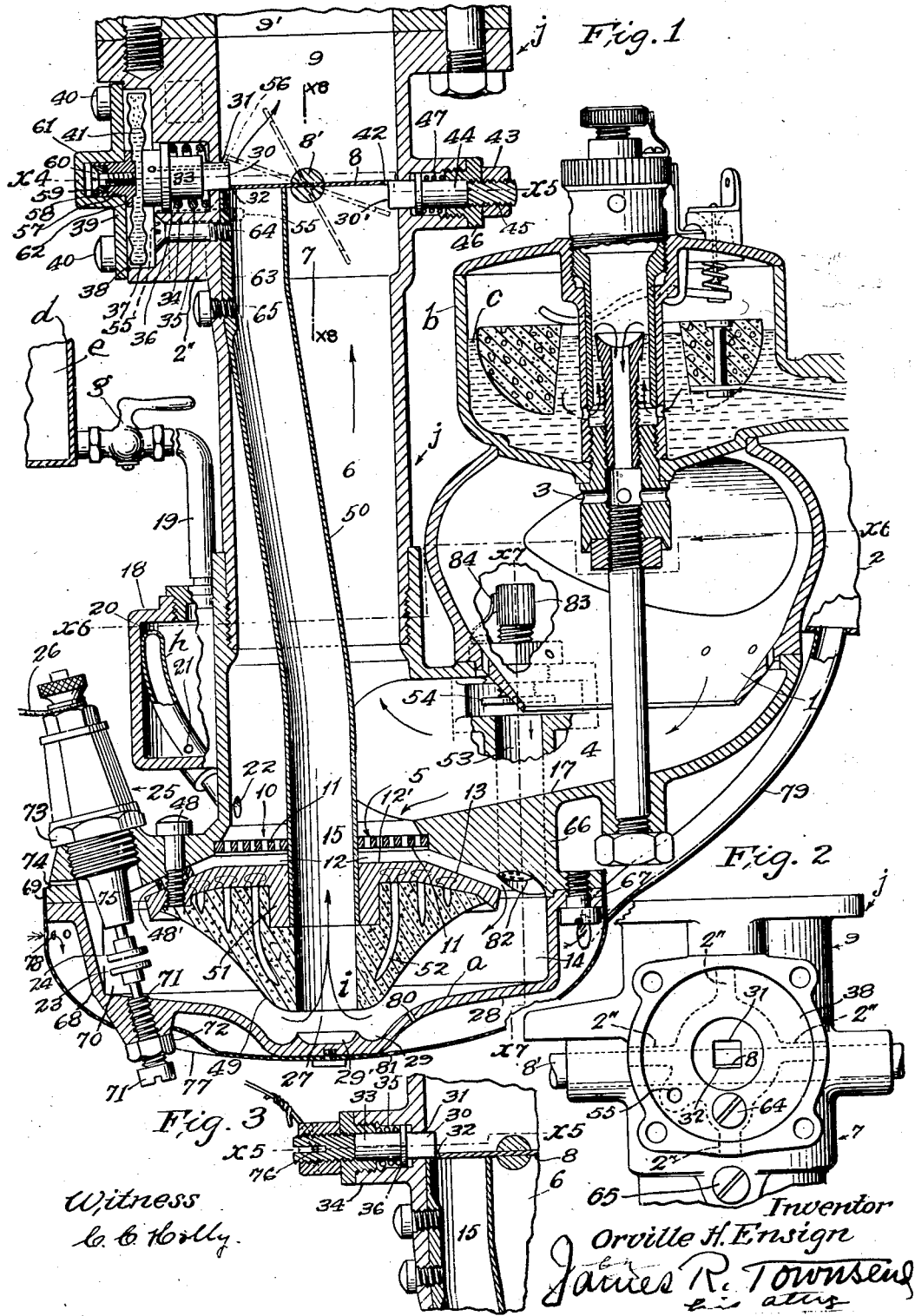

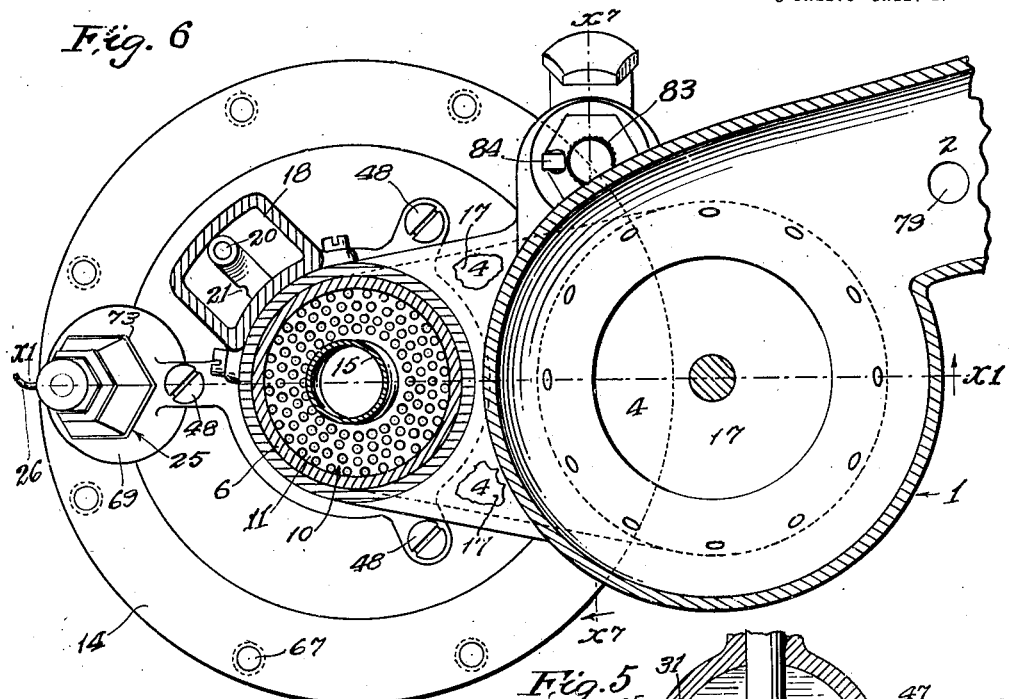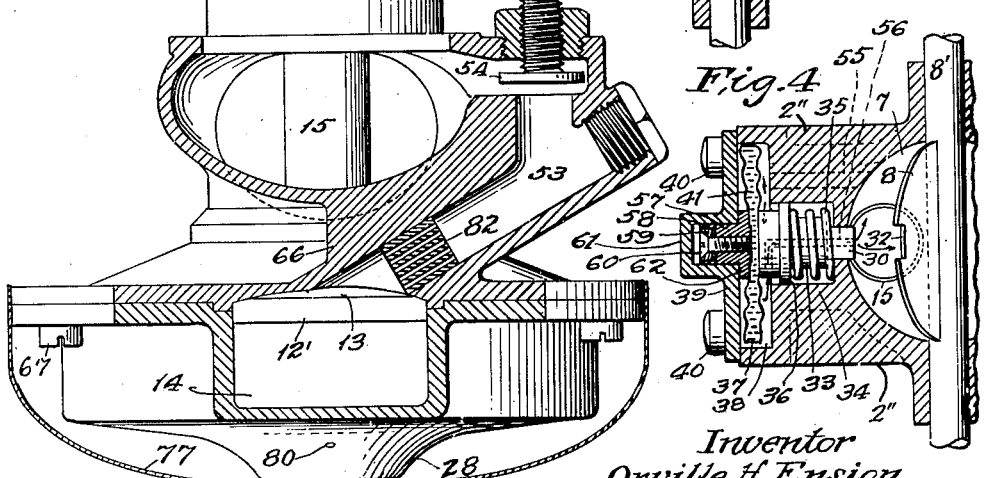

1,408,278.

Patented Feb. 28, 1922.

Witness
C. C. Holly

Inventor
Orville H. Ensign
by James R. Townsend

UNITED STATES PATENT OFFICE.

ORVILLE H. ENSIGN, OF PASADENA, CALIFORNIA.

ART OF AND MEANS FOR LIQUID-FUEL CONVERSION.

1,408,278.  Specification of Letters Patent.  Patented Feb. 28, 1922.

Application filed December 29, 1917. Serial No. 209,593.

*To all whom it may concern:*

Be it known that I, ORVILLE H. ENSIGN, a citizen of the United States, residing at 903 Oakland Avenue, in the city of Pasadena, county of Los Angeles, and State of California, have invented a new and useful Art of and Means for Liquid-Fuel Conversion, of which the following is a specification.

This invention relates to improvements in the apparatus set forth in my copending application for Letters-Patent of the United States, for method of and means for producing explosive mixtures of air and fuel, filed July 5, 1917, Serial No. 178,869.

An object of this invention is to provide improved means whereby liquid fuel and air may be converted into a combustible of superior character for power purposes.

An object is to provide simple and convenient means whereby kerosene or other heavy liquid fuels may be used in engines constructed as gasolene motors, without any likelihood of failure to supply the appropriate mixture at all times.

I have discovered that in order to conveniently utilize these heavy oils with the same certainty of action as with gasoline in engines constructed for the use of gasoline, it is necessary that appropriate pre-combustion of a part of the fuel be effected, and that this can be done in a preliminary combustion chamber supplied with fuel and air taken from the mixture of air and fuel such as is supplied in the usual way by a carbureter; so that at all times there will be supplied a portion of hot gaseous fuel for mixing with vaporous fuel, and that the intensity of this pre-combustion and the volume of mixture involved shall vary to accommodate the various requirements the engine is called upon to fulfill.

The required pre-combustion is sustained by a portion of that mixture of air and fuel which is first produced by the carbureter; and this must be accomplished by means that are inherently or automatically operated by changes in temperature of external atmospheric air, or by changes in gravity of the fuel which will cause relative changes in the volumes of the fuel and air that will pass through the chamber in which such pre-combustion occurs and which for convenience of description will hereinafter be termed the combustion chamber, it not being regarded as necessary hereinafter to distinguish it from the final combustion chamber which is the engine cylinder.

For example, when an engine is under full load it is necessary in order to obtain full power, that the engine cylinders be allowed to fill with the maximum possible weight of fuel and air, and therefore it is necessary that the temperature of the fuel delivered to the manifold of the engine be as low as practicable, due consideration being given to even density of mixture and even distribution to all cylinders, thus avoiding condensation.

Just the reverse is true when the engine is idling and it is desired to open the throttle and accelerate the engine under load. In such case the temperature of the mixture of fuel and air delivered to the manifold must be high in order to prevent condensation; because when the motor is running slow the fuel and air mixture moves slowly through the manifold, and sudden opening of the throttle will cause condensation if the temperature is low. Due to that fact and to the fact that at low motor speed, under load, the manifold vacuum is low, the fuel at low temperatures tends to immediately condense, and upon such condensation the motor would cease to operate; but if the temperature of the mixture is high at low speeds, the motor will continue to operate and pick up to higher speeds as quickly as though the very best gasolene were used.

I have discovered that it is possible to use kerosene and other heavy oils as a satisfactory and highly economical fuel for internal combustion engines adapted to burn gasolene and other light fuels. In this invention I treat the original combustible mixture of fuel and air so as to provide a combustible which so far as I am aware is broadly new in that it is a combination with hot fixed hydrocarbon gas of a mixture of air and vaporized fuel; said combination being in fog-like condition; said gas and air and vaporized fuel being mixed together to form the combustible.

A principle of this invention is that liquid fuel is by separate processes converted into two fluid compositions one of which is produced by partial combustion and by cracking, and the other of which is produced by vaporization, and the two products are mixed to form the final explosive combustible. Hot gases produced by partial combustion and fuel-charged air that has not been subjected to combustive action, are brought together within a single passage before they are introduced to the place of complete combustion.

The invention involves apparatus in which I have combined a gas producer, a carbureter and a diffusion chamber, whereby two distinct products are independently made from a combustible mixture of liquid fuel and air, and are then mingled to form a new product which is especially adapted for the operation with heavy fuels, of internal combustion engines originally designed for using gasolene, or other distillates lighter than kerosene.

I am not aware that prior to this invention there has been any apparatus which could act as a means for furnishing explosive mixtures to internal combustion engines from gas producing apparatus without air being added to the product between the apparatus and the engine piston; and in prior constructions, the added air constitutes by far the greater bulk of the mixture flowing to the engine chamber.

This advance in the idea of means and method is broadly new and pioneer.

An object of the invention is to make the operation of an internal combustion engine smooth and flexible with wide ranges of speed irrespective of the grade of fuel used, and this I effect by separating the fuel into two portions, vaporizing the one and gasifying the other by partial combustion, and then bringing the resultant products together before introduction to the engine or other place of combustion.

The immediate product of the gas producer is fixed gas and finely divided free carbon.

A further object of the invention is to produce and utilize the gasified fuel product with simple means and with no more attention than is required for using gasolene with an ordinary carburetor.

Another object of the invention is to produce a fuel containing related gaseous and vaporous portions varying as to the proportions of said portions at different speeds or loads of the engine; increasing the relative amount of fixed gases at low speed and correspondingly increasing the temperature so as to insure extreme flexibility at low speed; and diminishing the relative amount of fixed gases, and correspondingly lowering the temperature at high speeds and full loads, so as to utilize the full volumetric capacity of the cylinders, and hence the full power of the engine.

Another object of the invention is definite adjustment of the temperatures at low speeds. Another object is to provide for automatic limitation of temperature at the lower speed.

The major problem in connection with the development of this converter was encountered in getting a definite positive control of idling or low power mixture temperatures. It is found essential to have a definite positive draft through the combustion chamber at low speeds. The total amount of flow through the apparatus is so small at the low speeds that combustion in the preliminary combustion chamber is liable to die out unless a definitely controlled draft through such chamber is sustained. Experimenting with perforations in the throttle disk over the gas flue showed that it was practically impossible under varying temperature conditions to thus obtain any positive heat controlling action. The temperature at low speeds would either rise and continue to climb until it reached a temperature that endangered the permanence of the apparatus, or it would continually fall until it became so low that the apparatus was inoperative. This led to the development of a thermostat operated solely by the temperatures existing at any instant of time. The active element of such thermostat is an expansive medium susceptible to the heat of the gases and controlling an opening in the throttle over the gas flue. In that way, control of the idling temperatures is made practicable. The full power temperatures are dependent upon the relative areas of the flue for hot gases, and the passage for the mixture of air and liquid fuel.

I therefore regard the thermostatic arrangement which I have produced, as being a part of this invention in its automatic form, although hand regulation of the draft is possible and will be illustrated as a modified part of the invention.

Simplicity, economy of construction, ease of assembling, avoidance of clogging, resistance to destruction by heat, automatic adjustment of proportions during various phases of operation, and manual adjustment for other phases are objects attained.

A further object is to make provision whereby an internal combustion engine using heavy oils may be started with cold apparatus and put to work satisfactorily at once.

An object of this invention is to produce from all grades of fuel a combustible mixture that will maintain its mobile condition without condensation for a considerable period of time so as to increase the facility of operating the engine.

An object is to attain higher economy, greater flexibility and a cleaner motor than is generally possible with gasoline in common automobile practice.

An object is the utilization of climatic influences for automatic adjustment of the heat for producing the gasified portion of the fuel so that the appropriate proportions of the two constituents of the combustible for different climatic conditions will always be produced.

Hydrocarbon fuels now in common use are made up of constituents having various boiling points and an object of this invention is to use such liquid fuels most advantageously.

Further objects, advantages and features of novelty may appear from the accompanying drawings, the subjoined detail description and the appended claims.

The accompanying drawings illustrate the invention.

Figure 1 is a vertical mid-section on line indicated at $x^1$, Fig. 6 of an apparatus constructed in accordance with this invention and employing as the fuel and air measuring and proportioning device and mixer, a carbureter heretofore patented to me by Patents Numbers 1,064,627 and 1,064,628, granted June 10, 1913, and No. 1,223,159, granted April 17, 1917, in which the air properly proportions and violently disrupts fuel by vortical action. Portions are broken away to expose parts that would otherwise be hidden.

A portion of an internal combustion engine manifold is shown as forming an extension of the diffusion chamber. The converter is shown with its parts in position for idling operation. Dot-and-dash lines indicate the throttle as being slightly open, that is to say, mainly closed for light loads, and broken lines indicate the throttle fully open.

Fig. 2 is a fragmental elevation showing the thermostat chamber ready to receive the thermostat.

Fig. 3 is a fragmental sectional elevation of a manually operable draft regulator which may be substituted for the thermostatic regulator of Figs. 1, 2 and 4.

Fig. 4 is a fragmental cross-sectional plan at the level of line $x^4$, Fig. 1, the throttle being open.

Fig. 5 is a fragmental sectional plan detail on the level of line $x^5$, Figs. 1 and 3, showing the manual adjustment of Fig. 3.

Fig. 6 is a plan in section on line $x^6$, Fig. 1.

Fig. 7 is a fragmental sectional elevation on line $x^7$, Figs. 1 and 6.

Figure 8:
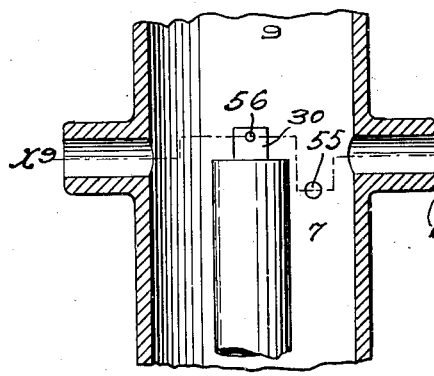
Fig. 8 is a fragmental elevation in section on line $x^8$ Fig. 1 omitting the throttle shaft and butterfly valve.
Figure 10:
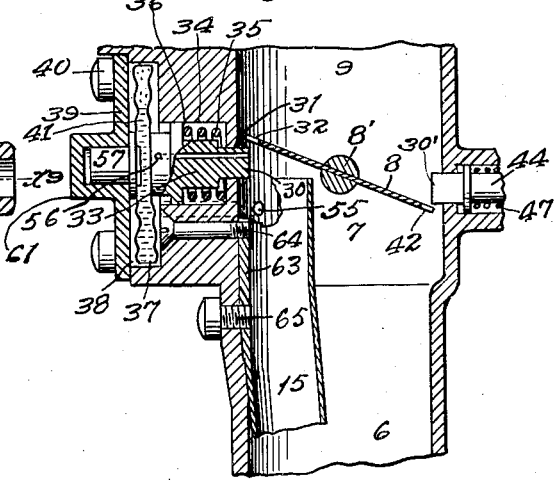
Fig. 10 is a fragmental sectional elevation showing a position of the throttle for very light loads while the suction past the throttle through a notch in the throttle valve strongly affects the draft through the flues.
Figure 9:
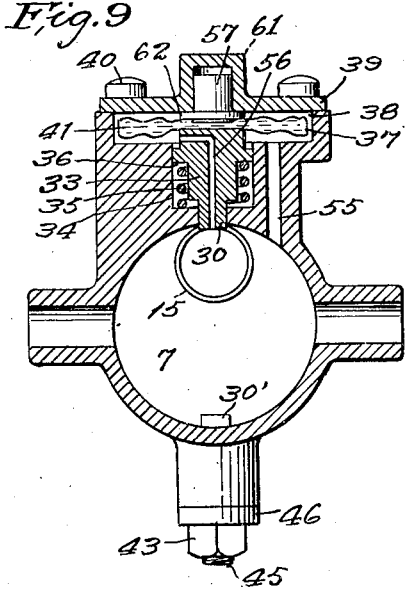
Fig. 9 is a plan section through the thermostat showing the thermostat draft passages.
Figure 11:
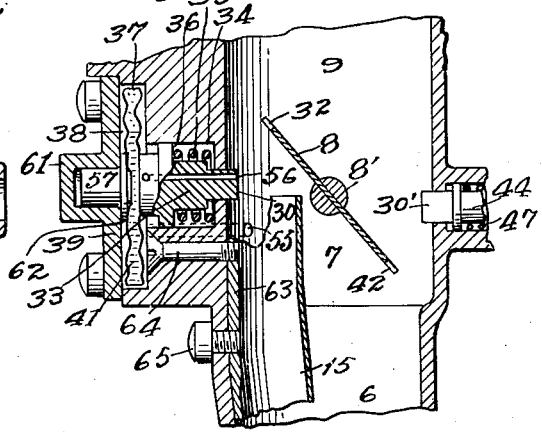
Fig. 11 is a view analogous to Fig. 10 showing the throttle in position under partial load when the flow through the flue and stack is proportional to their relative areas.

In Fig. 1 the line which indicates the planes upon which Figs. 4 and 5 are viewed is indicated by a jogged horizontal line. The form shown in Fig. 4 is the same as that shown in Fig. 1, while the form shown in Fig. 5 differs from that shown in Fig. 1 in that in Figs. 1 and 4 the thermostat control regulator for the draft aperture is shown, while in Fig. 5 the manually operated regulator for the draft aperture is shown. The line $x^4$—$x^5$ in Fig. 1 is designed to approximately locate the plane at which the sections 4 and 5 are taken.

The invention may be carried out with various types and forms of carbureter or mixing valves or devices that will properly measure and proportion the fuel and air entering a bend in a passage, at which bend diversion of a portion of fuel and air to the place where gas producing may begin, is effected; and I shall illustrate the construction and arrangement I deem most desirable and effective.

The mixing chamber of a carbureter is shown as the initial metering and mixing chamber 1 of the converter. This chamber 1 receives its air through the inlet 2 and its liquid fuel through the inlet 3 in a well-known manner and produces a more or less broken-up mixture of air and fuel which is emitted through the passage 4 that has an abrupt bend at 5 and extends through an upwardly directed limb or stack 6 to the throttle chamber 7 which is separated by the throttle 8 on shaft 8', from the diffusion chamber 9 in which diffusion of the gases, the liquid fuel and air mixture and consequent distribution of the heat takes place, thus converting the fuel into a new product that is ready for explosive combustion either in an engine cylinder, in the open air, or elsewhere. The stack 6, throttle chamber 7, and diffusion chamber 9 are all extensions of the passage 4, being given the above names for convenience.

The liquid fuel and air are supplied by suitable metering means, as the float valve chamber $b$ and the air inlet 2, operating in conjunction with each other and the engine suction, whereby liquid fuel and air are supplied in proportions to produce an explosive mixture; so that the final product issuing from the diffusion chamber 9 is adapted for complete combustion without addition of either air or fuel.

The engine manifold 9' indicates the manifold of an internal combustion engine by which an external force operates to supply the mixture of fuel and air to the conduit formed by said manifold.

At the bend 5 a downwardly extending passage 10 communicates through a fuel spreader which is shown as a screen 11 with a practically unobstructed distributing passage 12 extending above a circular distilling table 12′ having a frusto-conical spreading rim 13 located within the combustion chamber 14 from which a flue 15 extends upward through the bend 5 and through the vertical extension or stack 6 and the throttle chamber 7 to the throttle 8 which is of the butterfly form and fits upon the top of the flue, so that the single throttle 8 is common to both outlets from the carbureter 1 into the diffusion chamber 9, and the outlets from the passage through the gas flue and the vapor stack may be simultaneously closed and may be simultaneously opened by the operation of the throttle in one and the other direction respectively.

By the construction described in the foregoing description the result of suction applied to the diffusion chamber, as by the pistons of an engine in operation, will cause a flow of air and fuel through the mixture outlet or stack 6 and throttle chamber 7, and also through the combustion chamber 14 and hot gas flue 15 whenever the engine, not shown, is in operation.

In starting the device cold, liquid fuel is admitted to the carbureter while the engine is being started, and some of such liquid will flow down the slanting floor 17 of the passage 4 and by gravity through the fuel spreader 11 and thence onto the expansive surface of the distilling table 12′ whence it will flow down the slanting rim 13 into the combustion chamber 14 and down the sloping floor $a$ to the space directly below the intake $i$ of the flue 15.

In the case of kerosene or other heavy distillates or liquid fuels, the starting of the engine by vaporization through the medium of the apparatus so far described would not be possible, and it is necessary in order to start the cold engine into operation and to maintain such operation, that a lighter fuel be supplied. For starting purposes there is provided a primer chamber 18 connected by pipe 19 with an intermittent source of gasolene or other light liquid fuel; and said priming chamber is connected with the combustion chamber 14 through ports 20, 21 and 22, bend 5, and fuel spreader 11 and passage 12, and the liquid fuel will spread over the surfaces of the distilling table 12′ whence it may flow by gravity to the floor $a$, and may also be sucked by the action of the engine into said combustion chamber 14. Thence the gasolene, and air charged therewith, will be sucked through the flue 15 to the throttle 8 and past the same to the diffusion chamber 9 where the light fuel and air mixture is commingled with the vaporous mixture that has passed directly up through the stack 6 from passage 4 and fuel directing bend 5.

In order to set up a gasifying action within the combustion chamber 14, it is necessary to ignite fuel within such chamber, and this is practically effected by an electrical spark at the electrodes 23, 24, of the spark plug 25.

The electric current through the lead 26 to said spark plug may be produced by any suitable means as by a magneto, by a battery and spark coil, by a series spark plug, not shown, located in one of the cylinders of the engine, or by any other suitable means which may be devised for the purpose. As the engine is turned over and a spark is produced in chamber 14 under the conditions above specified, the onflowing mixture of fuel and air in the combustion chamber 14 ignites, and combustion in such chamber is initiated; the flame sweeping downward from the rim of the distilling table toward the inlet of the flue 15.

A grooved circular pit formed in the combustion chamber bottom 28 is provided underneath the flue 15, with two sumps 29 and 29′. Sump 29 is an annular channel and sump 29′ is a small cup centrally located underneath the end of the flue 15. At the outset of the starting operation, liquid fuel accumulates in both sumps 29 and 29′ and the heavier portions of the fuel in most stages of operation will momentarily stop in these two places, thus causing liquid fuel to accumulate on the floor below the bottom of the flue around which the fuel may be in a flaming condition. The fuel leaving the edge of the distilling table 13 is then drawn by the suction from all sides toward the center of the combustion chamber 14 as a flaming mass and such mass encounters an excess of fuel at the center in the sumps 29′, 29 and that excess of fuel, together with the increased vacuum produced by the drawing of the flame into the lower end of the flue, causes the flame to be extinguished at the entrance of said flue.

This operation is continuous with the air and fuel flow; and the heaviest portions of the fuel will constantly accumulate in and be distributed from sumps 29 and 29′ while said flow continues.

The product resulting from the extinguishment of the flame at this point passes up through the flue and through the throttled outlet from the flue into the diffusion chamber 9 simultaneously with the vaporous products passing up through the throttle chamber 7.

It is extremely important that the draft through the combustion chamber be controlled, thus to control the volume of combustion going on in the combustion chamber, and thereby to control the resultant heat released, and the amount of gaseous products produced. This end is accomplished in a general way for full load condition by maintaining a proper relation between the areas of the passages formed by the flue 15 and the stack 6; and by means of opening and closing the throttle 8; also at the lower speeds of the motor, definite proportioning of the amount of vaporized fuel and gas products passing to the diffusion chamber 9 must be effected, and such products are subjected to adjustment. This is accomplished by temperature and idling adjustments one being on one side and the other on the other side of the throttle valve.

30 is a plug or block that is preferably rectangular or square in cross section extending through an orifice 31 in the wall of the diffusion chamber 9 and fitting into a rectangular notch 32 in the throttle 8, and adjustable therein to open and close the orifice through said notch.

In the automatic construction said block is a square plug 30 formed as a terminal of a cylindrical slide 33 working in a cylinder 34 and retracted from the notch 32 by a spring 35 acting against a shoulder 36 to compress the center of one wall of a thermostatic element in the form of a capsule 37 that is located in a chamber 38 closed by a gland 39 detachably fastened in place by cap screws 40. The capsule is supplied with a charge 41 of alcohol or some other liquid that has a low boiling point, and the spring normally holds the slide retracted to open a port at the notch 32 a required amount when the throttle is closed and the flue is cold. The thermostatic capsule is so mounted that it is susceptible to the heat of the products at the throttle, and when the liquid charge 41 becomes sufficiently heated, it will expand the capsule and force the plug 30 forward to close the port at 32 proportionately to the heat of such products.

The throttle 8 is provided with diametrically-opposite notches 32 and 42 into which corresponding blocks 30 and 30' extend. Both notches may be entirely closed by the blocks 30, 30' respectively, when said blocks are adjusted to that purpose. It is desirable, however, that there are at all times suction passages through said notches, so that when the engine is started or is allowed to run with the throttle closed, a flow of gaseous and vaporous products will occur in proportions determined by the fixed positions of the two plugs in the two notches.

The block 30' for the vaporous mixture port 42 is permanently adjusted by means of the nut 43 fitting the thread 45 of the cylindrical slide 44, which engages the gland nut 46, so as to retract the plug 30' as occasion may require against the force of the spring 47 interposed between the slide 44 and the gland nut 46. The adjusting nut 43 is turned into position to hold the plug 30' only partly inserted into the notch 42.

The two notches 32, 42 thus form regulable ports from the passages 6 and 15 to the passage formed by chamber 9 and manifold 9'.

When the thermostat is cold the spring 35 in Fig. 1 holds the block 30 retracted so as to fully open the orifice 32 in the closed throttle. When the engine is turned over, the suction is applied to the flue 15 with a large measure of force to draw liquid fuel and air through the combustion chamber, and as the fuel becomes ignited by the spark at 23, 24, there will result a rapid combustion in chamber 14 and a consequent large production of hot gases for flue 15. This rapidly puts the converter into action, thus avoiding starting delays, especially in cold weather. As the temperature of the gas in flue 15 and the stack 6 rises, the thermostat operates to gradually close the orifice at 32 until the temperature for steady idling operation is reached. The thermostat holds the block in this position during low idling. When the engine speeds up, thus reducing the temperature, the thermostat cools and the spring 35 will retract slide 33 with the plug 30 to an open position.

The priming means are operable through the action of the thermostatic means to supply gasolene appropriately to start the converter into action. When the converter is cold the thermostatic capsule 40 is contracted, leaving the port 32 open, so that upon cranking the engine with the throttle closed, a strong draft is produced through the flue 15 and strong suction occurs downward through the passage 10 from the stack 6 and consequently such suction is effective at the port 22, thus causing a requisite amount of gasolene to flow through chamber 14 to start the engine. After starting, the apparatus still being cold, the gasolene will continue to flow through the hole 21 until the chamber 18 is emptied through port 22.

Another condition due to the thermostatic action, results when the apparatus is hot. Under the hot conditions the port 32 may be closed or nearly closed, so that there is but little draft through the flue 15. Also the fuel spreader 10 is hot and the distributer 13 is also hot, thus tending to volatilize the kerosene or other heavy fuel; and a very small prime is then given. In such case the gasolene will flow only through the hole 21 and falling onto and striking the above-mentioned hot surface, will rise in a cloud of distilled gasolene around the outside of the flue 15, and will be drawn into the engine cylinders and exploded so that the engine will start in this manner. In other words, the gasolene is not drawn through the combustion chamber 14 when such chamber is hot; but is vaporized and flows at once to the cylinders and is there exploded.

When the throttle is closed during engine idling, there is applied a positive, definite controlled suction on the flue 15 through notch 32, due to the great difference of pressure upon opposite sides of the throttle; but the flow produced by such suction is limited by the regulated opening of said notch 32. As the throttle is opened to working position, this positive, definite, limited suction through the flue is changed to one that is in proportion to the various resistances to flow through the fuel spreader 11, by-pass 53, combustion chamber 14 and flue 15, as compared with the resistance to flow through the stack with the throttle wide open. The relative flow through stack and flue is therefore made variable.

When the throttle is closed, the draft through the flue and combustion chamber is under a definite, positive control by means of the thermostat operating through the block 30 in notch 32; and consequently there is a definite control of combustion and of the amount of heat released in the combustion chamber.

It is thus seen that the load temperature is determined by the various resistances of the two passages and those imposed by the various throttle positions; and the idling temperature is controlled by thermostatic regulation of the draft through the flue.

The cast-iron distributing table may be secured in place by any suitable means as indicated by the cap screw 48 and is spaced from the roof of passage 12 by means of a washer 48'.

The heat liberated in the combustion chamber is very intense toward the flue inlet 27 because the tip of the flame occurs there, and it is necessary to minimize the destruction which might result from the action of such liberated heat.

The reason of the production of such intense heat near the inlet 27 of the flue is that the fuel enters the combustion chamber through the screen 11 somewhat unevenly with respect to the cross section of the combustion chamber 14 and the mixture does not reach a maximum condition for combustion through the usual process of flame formation until it reaches the mouth or opening 27 to the flue 15, at which point the heat is most intense as is shown by the fact that the main body of the refractory guard becomes sooty while the small end of the refractory guard 49 burns clean; indicating that the tip of the flame and the nearest approach to complete combustion is at said spacing. There is a concentrating or maximization of heat in this narrow cross section of the gas passage while the outer portion of the under face of the refractory guard and the underhanging edge of the distilling table 12' remains sooty. Some special construction is required to meet this intense heat and I have shown the underside of the cast-iron distilling table provided with an inverted frusto-conical hollow refractory guard 49, which forms a downward extension of a tube 50, that forms the upper limb of flue 15 and is inserted into a hollow boss 51 that extends down from the distilling table 12' and makes a tight connection with the tube 50. Said refractory guard 49 is conveniently made of high grade furnace cement molded in place on the lower side of the distilling table 12', which may be provided with reinforcing extensions 52, that are molded at one end in the cast-iron table 12'. The bore of said guard forms the intake $i$ of flue 15.

The refractory furnace cement is somewhat porous and becomes more or less impregnated near its outer rim with inflammables, thus operating somewhat after the manner of a wick, and fuel from the impregnated portion, and thus sustains a satisfactory flame in the combustion chamber irrespective of the impulses produced by the engine through its manifold 9'. This guard so constructed corrects a tendency of the flame to be blown out by intermittent action of the engine.

With heavier grades of fuel or with kerosene in extremely cold weather, the tendency of the fuel to resist being broken up by the carburation causes the flow of oil through the screen 14 and into the combustion chamber to be greater in proportion to the air than would produce sufficient heat to cause the apparatus to operate satisfactorily. To accomplish this desired satisfactory operation, it is necessary to introduce more air and to provide means to supply an additional amount thereof to the combustion chamber. The tendency of the condensed fuel of low grade, or cold kerosene, is to fall to the bottom and to flow along the floor 17 of the passage 4, and therefore the upper part of such passage, under these conditions, is supplied with air relatively free from fuel, although being a part of the general mass of fuel and air passing to the bend 5. The apparatus is so constructed that a requisite quantity of air may be separated from the cold or more condensed fuel of low grade and introduced more directly to the combustion chamber. By the term "air" throughout this specification is meant air unchanged chemically from normal atmospheric air.

The requisite additional air in a sufficiently pure state is obtained by means of a port 53 leading from the upper part of passage 4, and opening into the combustion chamber. The intake end of said port is located above the level at which the heavy portion of the fuel is supported in passage 4 by the air current flowing toward the bend 5. The character of the separation which takes place depends upon the character of the means by which the separation is effected. If the port is disproportionate in size the separation may be excessive or deficient. As a means to bring the construction shown in the drawings to effective proportions, I have shown a valve 54 for the purpose of increasing and decreasing the capacity of the port. When a proper construction or arrangement of the port has been effected for a pedetermined general temperature the action of appropriate seperation at the different atmospheric temperatures and for the different grades of fuel, proceeds due to the inherent tendency of the different grades of fuel to vaporize to different extents at different temperatures; so that the degree of separation of the air from the fuel is determined automatically. With fuels of low boiling point there will be a very little separation from the air, after the mixture is formed, with the result that a rich mixture will pass through the port 53, and the combustion will be smothered and less intense; while with a fuel of a high boiling point the separation will be more marked and air relatively free from any fuel will pass through the port 53 and will cause a more intense combustion in the chamber 14 to occur; and in this same manner will this action upon different grades of fuel be modified by the changes of air temperature.

By means of the arrangement shown of passage 53 and the thermostatic control of the port 32, a variable relation is maintained between the quantities of hot gaseous fuel and the mixtures of fuel and air. These elements constitute means to regulate the flow of fuel through the upright passages.

In extremely warm weather, fuels having the high boiling points will, to a certain extent, be somewhat vaporized because heat from the combustion chamber will be conducted through the metal walls up to the carbureter parts; while if the external atmospheric air is very cold these parts will be cooled and less vaporization will take place before the mixture reaches the port 53. This inherent and automatic action due to climatic changes and changes of grades of fuel causes the port 53, in conjunction with the rest of the apparatus, to automatically determine the temperature of the whole mixture by changing the character of the material flowing through the port 53. In consequence, during cold weather, or with low grade fuels it will deliver nearly pure air, and in warm weather or with higher grade fuels, it will deliver more or less of a mixture of air and vaporized fuel, so that in cold weather the final mixture of fuel and air delivered to the manifold will be but very little cooler than in the hottest summer days, and it will at any time run much hotter with high boiling point fuels than with fuels having a low boiling point. For instance; when operating on kerosene with a certain engine at full load the temperature of the mixture in the manifold will be about 180° Fahrenheit. By simply shifting the valves so that gasolene is admitted to the apparatus, thereby using gasolene for fuel, the temperature of the mixture in the manifold will drop to about 115° Fahrenheit.

The construction and arrangement of the appliance and its various parts, as above set forth, is such that the operation of furnishing hot fixed gas from the combustion chamber is uninterrupted and continuous with variable intensity according to variations of atmospheric temperatures and variations of load and grades of fuel, and requires no attention on the part of the operator. The adjustment for the individual motor is made on installation in the usual manner by simply adjusting the carbureter element of the converter to produce the desired mixture as indicated by the performance of the motor.

The temperature of the mixture will fall with increasing load and rise with decreasing load when such loads exceed those which the thermostat will control, because at higher velocities of mixture through the apparatus, the mixture is in contact with the heated parts of the apparatus a shorter space of time; also the heating surfaces are limited to fixed dimensions while the volume of mixture passing through the apparatus varies through wide ranges. Hence, due to the limited transmission of heat from the limited surfaces, smaller quantities of mixture will get hotter than larger quantities passing in a given time.

In the converter so constructed, the automatic thermostat, the down draft combustion chamber, and the bypasses 53, constitute means to increase and decrease the heat of combustion in such chamber to meet variable atmospheric conditions, fuel conditions and load conditions with various positions of the throttle. The port 53 leads from the passage 5 and is controlled by the valve 54, used to regulate the amount of such air which may be allowed to pass from passage 5 into the combustion chamber. The port 53 enters the combustion chamber from above, diagonally, tangentially, and aslant, thus producing a whirling action of the mass of flame in the combustion chamber, and this corrects any lack of distribution of fuel which might occur due to heavy fuel flowing onto the table at one side only.

The fuel tends to enter the combustion chamber on the side towards the mixture passage 4. The by-pass port 53 introduces air to the combustion chamber on that side and does not reach a final mixture to produce a maximum temperature until it reaches the intake $i$ to the flue 15. In actual practice the refractory material becomes sooty except near the entrance to the flue 15 where said material burns clean and white thus indicating the location of the tip of the flame.

The outlets 20 and 21 from the priming chamber 18 are of different diameters and different elevations. When the engine is started cold, a considerable amount of gasoline is desired at the inlet to the stack 27. By supplying the priming chamber 18 with a rather large amount of gasoline, the fluid will fill chamber 18 and overflow through the upper hole 20 while also flowing by gravity through the lower hole 21. This immediately furnishes a quantity of gasoline sufficient to start the motor and to continue flowing through the hole 21 until the charge in priming chamber 18 is exhausted. The charge is gaged to make this period long enough to accomplish the ignition of the kerosene or other heavy fuel flowing into and through the combustion chamber or fire box and to continue kindling to such an extent that the flame will not blow out; and thereafter the motor will run upon the mixture of gases and vapors produced by the converter in normal condition.

This kindling operation is effected by a charge of gasolene that will be exhausted by 100 revolutions of the engine.

The electrodes 23, 24 are provided with flat surfaces juxtaposed, the purpose being to prevent insulation of the electrodes by the liquid fuel introduced into the combustion chamber 14; the operation being to the effect that by capillary action between the juxtaposed surfaces the rims of the electrodes will be sufficiently freed from fuel at some point to allow a spark to occur. In practical operation it is found wherever the spark occurs while the fuel is between the surfaces, fuel is projected through the arc of current as a blast jet of flame of considerable length usually at right angles to the axis of the parallel disks.

In order to subject the thermostat capsule 37 to a temperature truly representing the temperature of the mixture of gaseous and vaporous products, means are provided for passing a portion of the heated vapors from the stack below the closed throttle 8, past the flue 15 and into and through the thermostat chamber 38 and thence into the diffusing chamber above the throttle 8. For this purpose a hole is drilled to form a passage 55 from the throttle chamber 7 to the thermostat chamber 38 and a hole is bored through the upper part of block 30 to form a passage 56 leading from the throttle chamber 38 to the diffusion chamber. Said passage 56 is preferably located near the top of the block so as to be above the level of the throttle 8 until the throttle is open on both sides of the shaft 8'.

The passages 55, 56 provide circulation when the throttle is in closed idling position as shown in solid lines at 8 in Fig. 1, so that hot vaporous mixture flows into the thermostat chamber and passes therethrough in contact with the thermostat capsule under suction due to the vacuum maintained above the throttle at part open position. The passage 56 in block 30 leading from chamber 38 is much smaller than the passage 55 leading from the throttle chamber to the thermostat chamber, so that the pressure in the thermostat chamber will always be approximately the pressure of the throttle chamber 7 underneath the throttle disk 8, to avoid imposing upon the thermostatic capsule the vacuum of the diffusion chamber above the throttle under idling conditions, the effect of which vacuum would be to cause the thermostat capsule to expand by other force than that due to the temperature acting upon the liquid contained in the capsule. It is important that said capsule shall operate thermostatically so that the position of the block is governed only by the heat of the fuel passing the throttle.

The construction including the oppositely-notched throttle and the blocks adjustable in the notches thereof as stated, allows the adjustment as to temperature and as to fuel for low idling speeds to be accurately made and automatically maintained.

The capsule 37 is made of thin sheet metal corrugated or otherwise constructed to allow expansion and contraction of the chamber of said capsule, and a nipple 57 is soldered to the inner walls and its bore has an enlargement 58 at the outer end to contain a gasket 59 which serves as packing for the head of the screw plug 60 that passes through said gasket and is screwed into the inner bore of the nipple 57. The capsule may be constructed in any practical way and if the parts are soldered together, silver solder is sufficient to withstand the heat encountered. When the capsule is soldered it is partially filled through the nipple with alcohol or the like, and then the gasket is inserted into the nipple and the screw plug 60 screwed home. The thermostat cap 39 is provided with a hollow base 61 in which the nipple is inserted, thus giving a firm support to the capsule inside the thermostat chamber when the cap is fastened by the screws 40.

The operation of assembling is very simple. The spring 35 is first inserted into the chamber 34 therefor and then the slide 33 with its block 30 is put into place and thereupon the cap 39 with capsule attached as above described is put in place, thus bringing the innermost wall of the capsule against the end of the slide 33, so that when the parts are cold and the cap in place, the walls of the capsule may be compressed at the center of the nipple and will compress the spring 35. Said nipple may be provided with a flange 62 to rest against the inner face of the cap 39, thus exerting pressure to compress the spring 35. In Fig. 1 the capsule is shown as being partly expanded by the heat due to low idling speed, thus leaving a small orifice at 32. An increase of the heat will further expand the capsule and fully close the orifice 32, while a decrease of the heat will allow the spring to entirely withdraw the block 30 from the passage through which the fuels flow.

The blocks 30 and 30' are adapted to fully close their respective notches 32 and 42 upon appropriate adjustment.

The block 30 extends above and the block 30' extends below the throttle disk 8, so that as the throttle opens, one side withdrawing away from the flue 15, the notch 32 moves up across the block 30 and the notch 42 moves correspondingly down across the block 30', thus gradually increasing the orifice through the notches and allowing increased flow respectively from the flue 15 and the stack 6 until the disk escapes from the blocks.

When the throttle starts to open from the closed idling position, the direct concentrated suction through the flue 15 begins to give way to a voluminous forced draft through said flue by reason of the partly opened position of the throttle and the speeding up of the engine due to such position. Immediately upon beginning to open the throttle, there is a violent increase of suction on the flue; the increase continuing up to an indeterminate point or angle of throttle position, and the suction then begins to diminish toward the position of wide open throttle where the suction upon the flue 15 becomes solely a result of the suction in chamber 9 resulting from the relation between the friction of the two passages that are composed of the mixture passage 4 and the bend 5 and the stack 6, as compared with the resistance through the distributing passage 12, the port 53 and the combustion chamber 14 with the flue 15; so that there is established a fixed, limited temperature under positive, definite control of the temperature controlling the notch 32 for idling position while the motor is idling free with the closed throttle. Upon beginning to open the throttle and beginning to take up load or accelerate the motor, there is an immediate building up of increasing combustion which is more or less forced by ejection effect caused by the throttle at its intermediate positions and the relative flow becomes fixed and definite at the wide open position of the throttle where it is limited or determined by the relative friction of the two passages, one formed by the combustion chamber and flue and the other by the main mixture passage 4, the bend 5 and the stack 6.

The flue 15 is provided with a reinforcing thickness of wall 63 in which the screws 64, 65 are screwed to fix said flue firmly in place. These screws and the screws 48 and the screen 11 give a firm setting to the flue and the refractory base 49.

The bottom 28 of the combustion chamber is detachably attached to the intermediate member 66 of the converter by screws 67, and is provided with a lateral extension 68 to conform to a lateral extension 69 of said intermediate member, thus to form a lateral chamber 70 to accommodate the electrodes 23, 24. The ground electrode 23 is fixed to an adjusting screw 71 having a jam nut 72, so that it may be fixed to any desired adjustment relative to the electrode 24 that is carried by the porcelain or like plug 73 that is screwed into the extension 69. In order to keep the insulated spark plug clean, a cold air inlet 74 opens through the extension 69 from the external air into the electrode chamber 30 and the suction which produces the combustion in the combustion chamber also sucks a current of atmospheric air into the space around the spark plug insulator 75, thus insuring nearly perfect combustion around the plug and a consequent certain ignition.

In practice the float valve chamber $b$ of the carbureter will be supplied in the usual way with a constant supply of kerosene or other heavy liquid fuel $c$, and the gasolene tank $d$ will be filled with gasolene $e$ ready for supplying the starting charges to priming chamber 18 through pipe 19 whenever the normally closed valve $g$ is opened. Such a valve is adapted to supply in variable quantities, a limited charge of gasoline through the combustion chamber 14 to the stack and flue.

The starting up operation when the engine is cold is as follows:

The operator first opens the manually operated valve $g$, allowing small priming chamber 18 to fill with gasolene until it overflows through port 20 at the top of the small standpipe $h$ giving a relatively large charge of this light fuel to the screen 11, from which it flows into the sump at the bottom of the chamber. The apparatus being cold, the thermostatic liquid 41 will be contracted so that the spring 35 causes the two walls of the thermostat capsule to collapse and contact with each other and the thermostat valve block to be withdrawn from notch 32 until even with the inside of the wall of the diffusion chamber 9, this leaving an opening of considerable size through notch 32 of the throttle over the second passage or flue 15. Then the motor will be cranked, tending to produce a high vacuum in the diffusion chamber 9, flue 15 and combustion chamber 14, which causes the gasolene in the sump 29 to be drawn with bubbling air into the flue and through the widely open notch 32 into the diffusion chamber 9, causing the gasolene to be finely vaporized so that it issues through the notch 32 of the throttle as a violently projected atomized spray making a good starting mixture which flows through the manifold 9' to the motor. Immediately the motor is thus operated, a spark occurs at the spark points 23 and 24 in the combustion chamber and the gasolene flowing over the distilling table 12 is ignited. The suction through flue 15 acts on the carbureter and immediately the kerosene or other heavy oil fuel will begin to flow through the screen 11, thence onto the table 12', 13 and into the flaming gasolene in the combustion chamber 14.

With the apparatus cold just starting, practically all of the kerosene flows through the screen 11 and into the chamber 14 and onto the floor of the combustion chamber, and, being heated, partly vaporized and ignited by the flaming gasolene, produces a mass of flowing fuel flaming from the surface and very hot. This flaming fuel, with the flame, is, for a short time drawn through the flue 15 and at any position of the throttle produces a dense fog-like mixture of fixed gas and hot fuel in the diffusion chamber 9 and manifold 9'. After a few moments' operation, the intermediate member 66 including the top of the combustion chamber and the upwardly extending portions thereof become extremely hot, so that a larger percentage of fuel is vaporized from these hot surfaces, thus diminishing the amount of fuel which will enter the combustion chamber through the screen 11. This results in limiting the fuel entering the combustion chamber to those heavier portions which have a high boiling point. As the temperature climbs farther this phenomenon is increased until these high boiling point fuels will expand and distil violently on striking the distilling table, and by their expansion will still further limit the amount of fuel and air passing through the combustion chamber, until a definite temperature of mixture entering the diffusion chamber will be reached, according to position of the throttle and speed of motor, except that for a nearly closed position the temperature of the mixture is determined by the character of the mixture of air and fuel which enters the combustion chamber and which character is dependent upon the relative density of the fuel and the air responding to the draft through the screen.

With the converter fully warmed up as a result of the conditions and operations just described, the load temperature in the summer time will be between 190 and 200° Fahrenheit with a converter in which the area of the flue is equal to 1/7 the area of the stack; as indicated in the drawings.

In winter weather it will fall somewhat below that and may register a temperature as low as 170° Fahrenheit and sometimes as low as 160° Farenheit. Upon closing the throttle to idle the motor or to move slowly along the road, in case of an automobile, the pressure in the manifold will fall; and generally this pressure will assume a depression below normal atmospheric pressure at sea level of about 8 lbs. to the square inch. It can be seen therefore that with a mixture at 170° to 180° Fahrenheit and freezing weather outside, sudden opening of the throttle will be accompanied by an inrush of cold air which would chill the mixture and cause condensation thereof, not only because the air is cold but also because, irrespective of whether the motor is loaded or not, if the throttle is fully opened the pressure within the engine manifold will instantly rise to somewhere near atmospheric pressure, and if the motor responds immediately to the full speed under the load conditions, it will not fall, under open throttle conditions, to more than 2 lbs. below the pressure of atmosphere. This sudden rise of pressure and inrush of cold air would cause condensation and be likely to stall the motor if the tendency were not corrected. It is corrected in this invention by the open passage from the flue through the notch 30 to the manifold, so that the draft of the engine upon closing the throttle is mainly supplied through the combustion chamber, thus causing an immediate, definite and rapid increase of combustion with a consequent liberation of heat; and this results in immediately building up the temperature of the whole apparatus so that upon opening the throttle after having closed it for a short period, it occurs that in spite of the increased pressure or lower depression below the atmosphere and the inrush of cold air; the extra heat just previously supplied causes operation to continue in a normal way by sustaining vapor pressure and temperature relations so that condensation does not wholly take place. To make this control more definite and to respond to all conditions of combustion and of the weather and the fuel, the block 30 in notch 32 is operated by a thermostatic capsule filled with a fluid which has the boiling point of 170° Fahrenheit at normal atmospheric pressure at sea level. Alcohol has been used with satisfactory results.

After running approximately one minute with the throttle in the closed or idling position, the thermostat, still being acted upon by hot mixture from below the throttle, will get warmer, due to the general rise of the temperature of the mixture and the whole apparatus, and the capsule will expand, thus causing the block to close the opening of the notch 30 to the point that will maintain the idling temperature desired which is between 212° and 225° Fahrenheit. There is thus provided automatic control of the limit of idling temperature, and automatic control of the return to idling temperature after a load run. In extreme cold weather the atmospheric temperature tends to a lowered temperature in the thermostat chamber and this tends to a continual holding open of the notch 32 by the thermostat valve, and will cause the control of light load temperatures. For example, in slow speed running, as with an automobile in traffic, the throttle being only partly open, the open notch 32 causes the draft through the flue to build up the combustion in spite of the lowering temperature of the atmosphere, thus maintaining satisfactory flexible operation. By like automatic activities such flexible operation is maintained under all atmospheric conditions. The block 30' on the opposite side from the thermostat is provided to adjust relative movement of fuel and air passing the throttle at the idling position and controls the idling speed only.

For varying atmospheric temperatures, similar variations of load temperatures of the mixture in the manifold will take place in a relatively very small degree. For the cooler atmospheric temperatures more fuel will pass through the combustion chamber and will be so acted upon that it will produce a condition of mixture in the diffusion chamber that will compensate for the lowered mixture temperature, because an excess of hot liquid fuel in contact with the flame in the combustion chamber will be drawn up through the flue and will be delivered to the manifold in a fog-like condition. This results because this fuel is delivered to the flue 15 at a temperature very near the distilling point, and the drop of pressure due to the suction in the flue, and to the mingling of the flame and fuel at the lower end of the flue, will cause the fuel to issue from the upper end of the flue fully vaporized, and said fuel will be converted into a fog-like mixture upon contact with the cooler air, flowing into the diffusion chamber from the stack.

In starting cold the fact that all of the fuel passes through the fire-box and is converted into a fog-like mass makes possible with a cold motor and freezing weather to immediately put the motor in operation under load, and it does this without the attending difficulties that have heretofore existed due to condensation of fuel, on the cylinder walls which has a bad effect upon lubrication of the walls as well as passing fuel to the crank case and spoiling the lubrication there.

With the manual form of temperature regulator shown in Fig. 3, the spring 35 normally holds the block 30 in notch closing position and the operator, by means of the connection formed by the wire 76 leading to the operator's station may withdraw the block 30 from the notch 32 and hold it there as long as may be necessary to allow the suction of the engine to cause such draft through the flue 15 as will so increase the amount of gaseous fuel produced, as to rapidly bring the converter into full action.

The results of these various operations make it possible to start cold motors of automobiles and also motors for other purposes into immediate action in the coldest of weather, using kerosene or other similar low grade fuels with but slight gasolene priming and without waiting for manifolds to be heated from exhaust gas, and in all cases the engine may be immediately put under load and will operate successfully. The operation under various speeds is provided for by the action of the thermostat moving the plug 30; and thereby opening and closing the notch in the throttle disk when operating under light loads; thus insuring a high temperature and great flexibility for light and intermediate work such as passing through congested city traffic.

One of the great advantages of using fuel in this form is the avoidance of damage to engine cylinders, valves and spark plugs; the combustion being so complete that the spark plugs are never fouled in any manner. After tests extending over long periods of time no necessity for regrinding the valves is apparent, and there is no deposit of carbon in the cylinders. Private road tests with an automobile for over nine months continuously from five to fifteen hours a day shows less up-keep of engine with kerosene than with similar engines using present day gasolene in present day operating methods.

The air heating chamber 77 is applied to the bottom of the combustion chamber 14 and is connected by a suction pipe 79 with the air inlet 2 of the carbureter. Air inlet orifices 78 are provided on the opposite sides of the air chamber 77 from the outlet to the suction tube 79, so that the air drawn through the suction tube 79 will be supplied from the opposite side of the combustion chamber and will pass around said combustion chamber having the double effect of extracting heat from such combustion chamber and delivering it to the carbureter, and thus conserving heat for carrying on the process involved. At the same time the air chamber 77 serves as an insulator to prevent undesirable cooling in cold weather.

The drainage outlet 80 in the floor of the combustion chamber 14 allows overflow escape of the heavier liquid fuel in the case of overpriming of the combustion chamber. Said drainage outlet 80 is located about on a level with the intake to the frame-extinguishing flue, so that fuel carried by the sump 29 may be more directly acted upon by the air flowing by suction to the flue 15 and will be drawn up and will not close the entrance to the flue against admission of the mixture of air and fuel, in starting. Said drain outlet 80 discharges into the air chamber 77 which is provided with final drainage outlet 81 to the open air. The outlets 81 and 80 may admit a small amount of air to the combustion chamber but are of a limited size, so that the amount of air admitted will be negligible. In practice, a drilling of about 25/1000th of an inch in diameter is used for the outlet 80 and the air vent 74. In the drawings these orifices are exaggerated for clearness of illustration.

The by-pass 53 is protected against back-firing from the combustion chamber 14 by means of a fire screen 82.

The valve 54 is provided with a milled head 83 and retaining spring 84 engaging the same, so that the valve can be accurately set to any pre-determined adjustment.

I claim:—

1. In a fuel converter, means for preparing explosive mixtures of air and liquid fuel for combustion, comprising metering means whereby the air and liquid fuel may be supplied in proportions adapted to complete combustion, and measurably mixed; a passage to receive air and fuel from the metering means; means to divert the heavy constituents of the liquid fuel with some air from said passage; a combustion chamber to receive such diverted fuel and air; means to ignite the fuel in said chamber; means including a flue to conduct the products of combustion from the combustion chamber to said passage beyond the place of diversion; and common throttle means to control the flow through said passage and the flue.

2. A fuel converter comprising a combustion chamber; a passage; a flue; means for continuously supplying to the passage, air and fuel in proportions adapted to complete combustion, and for producing a mixture from said air and fuel; means for applying suction to the passage and flue; means for diverting, from the passage to the combustion chamber, some of the heavier portions of said fuel, and some of said mixture of air and fuel; means for igniting the diverted fuel and mixture in the combustion chamber, and thereby producing a hot fixed gas in said chamber; said flue being adapted and arranged to deliver said hot fixed gas to the undiverted portion of said mixture beyond the point of diversion; and common throttle means to control the common suction to both the passage and the flue.

3. In a fuel converter, means for supplying a mixture of fuel and air to a passage in proportions adapted to complete combustion; means for diverting the heavier portions of such fuel and some of such mixture to a combustion chamber; means for igniting such diverted portions; flue means for returning the products of combustion from said combustion chamber to the undiverted portions of the mixture in such passage; and common means for controlling the flow through the passage and the flue.

4. In a fuel converter, means for supplying a mixture of fuel and air to a passage in proportions adapted to complete combustion; means for diverting the heavier portions of such fuel and some of such mixture to a combustion chamber; and by-pass means for adding to the diverted portions some air comparatively free from fuel; means for igniting such diverted portions; flue means for returning the products of combustion from said combustion chamber to the undiverted portions of the mixture in such passage; and common means for controlling the flow through the passage and the flue.

5. In a fuel converter, means for supplying a mixture of fuel and air to a passage in proportions adapted to complete combustion; means for diverting the heavier portions of such fuel and some of such mixture to a combustion chamber; means for igniting such diverted portions; flue means for returning the products of combustion from said combustion chamber to the undiverted portions of the mixture in such passage; and common throttle means for controlling the passage and the flue; said diverting means being operated on by the heat of the combustion chamber to reduce the release of heat in the combustion chamber for fuels of light grade and to increase the release of heat for fuels of heavy grade.

6. In a fuel converter, a combustion chamber; a passage; means for supplying a mixture of fuel and air to the passage in proportions adapted to complete combustion; means for separating and diverting by gravity and distillation, the heavier portions of such fuel, and also diverting by draft, some of the lighter portions of the mixture, all of said diversion being to said combustion chamber; means for igniting such diverted portions in the combustion chamber; flue means for returning the products of combustion from said combustion chamber to the undiverted portions of the mixture in said passage; and common throttle means for controlling the passage and the flue.

7. A fuel converter comprising a carbureter for furnishing a metered explosive mixture of fuel and air; a combustion chamber located below said carbureter; a diffusion chamber; passages to conduct products from the carbureter to the diffusion chamber directly, and also through the combustion chamber, for the purpose of producing an explosive mixture by combining products of the carbureter and the combustion chamber continuously within the diffusion chamber; and a throttle to regulate the flow of both products to the diffusion chamber.

8. A fuel converter comprising an upright passage; means for supplying air and liquid fuel to the lower end of said passage; an open-ended tube within said passage; a combustion chamber connected with the lower end of said tube to deliver hot fuel gases thereto; means connecting between the passage and the combustion chamber to continuously supply said combustion chamber with a portion of the fuel and air delivered to said passage; means for regulating the flow of fluids through said passage and tube; and means for igniting the contents of the combustion chamber.

9. A fuel converter comprising an upright passage; means for supplying air and liquid fuel to the lower end of said passage; an open-ended tube within said passage; a combustion chamber connected with the lower end of said tube to deliver hot fuel gases thereto; means connecting between the passage and the combustion chamber from two different elevations to continuously supply said combustion chamber with a portion of the fuel and air delivered to said passage; means for regulating the flow of fluids through said passage and tube; and means for igniting the contents of the combustion chamber.

10. In a fuel converter, means for supplying a mixture of fuel and air to a passage in proportions adapted to complete combustion; means for diverting the heavier portions of such fuel and some of such mixture to a combustion chamber; means for igniting such diverted portions; flue means for returning the products of combustion from said combustion chamber to the undiverted portions of the mixture in such passage; and common means for controlling suction common to both passage and flue to cause simultaneous increase or simultaneous decrease of fluid flow through the flue and the passage.

11. A fuel converter comprising means adapted to supply to an engine manifold, a vaporized mixture of fuel and air; gas producing means to supply hot fixed gas and free carbon to said vaporized mixture of fuel and air; means for regulating the temperature of said mixture of fuel and air, fixed gas and free carbon; and priming means for starting the gas producing means into operation; said priming means being operable by draft controlled through the action of said regulating means.

12. In a fuel converter the combination with two passages and means for supplying the same with different forms of combustibles, of a butterfly throttle adapted to close both of said passages and provided with ports for the passages respectively; and adjustable means to regulate the openings through said ports.

13. The combination with a stack, of a flue inside the stack; means to supply air and fuel to the stack; a combustion chamber at the intake of the flue; means to supply fuel and air through the combustion chamber to the flue; a butterfly throttle adapted to control the flow through the stack and the flue, said throttle being provided with a port communicating with the stack, and a port communicating with the flue; adjustable means to regulate the size of the port communicating with the stack, and thermostatic means to regulate the size of the port communicating with the flue.

14. The method of producing an explosive mixture of air and fuel which consists in supplying to a passage air and fuel in proportions adapted to form an explosive mixture; said fuel as introduced being composed of lighter and heavier elements; diverting heavier elements of the fuel, and some air, into a combustion chamber and igniting, and converting the contents of the combustion chamber into inflammable fixed gas and free carbon and then adding such inflammable gas and free carbon to the initial explosive mixture of air and fuel in regulated proportions by simultaneous adjustment of suction common to both the contents of the passage and the combustion chamber, and thereby forming the final explosive mixture.

15. The combination with a combustion chamber and a passage communicating therewith; of means to deliver a mixture of fuel and air to said passage; means for diverting a draft of fuel and air from such passage to the combustion chamber; means for supplying to the point of diversion a definite charge of gasolene to kindle fuel in said combustion chamber; means to cause an excess supply of gasolene from such charge to initially flow to the combustion chamber; means to continue the flow from such charge in a gradual manner to complete the delivery to the combustion chamber of the remainder of said definite charge; a flue having an outlet at the top for carrying the products of combustion from the combustion chamber; a throttle controlling the outlet at the top of said flue and provided with a port opening from the flue; and means to control the port, said port being adapted to deliver gasolene and air past said throttle under suction.

16. The combination with a combustion chamber and a passage communicating therewith; of means to deliver a mixture of fuel and air to said passage; means for diverting a draft of fuel and air from such passage to the combustion chamber; means for supplying to the point of diversion a definite charge of gasolene to kindle fuel in said combustion chamber; means to cause an excess supply of gasolene from such charge to initially flow to the combustion chamber; means to continue the flow from such charge in a gradual manner to complete the delivery to the combustion chamber of the remainder of said definite charge; a flue having an outlet at the top for carrying the products of combustion from the combustion chamber; a throttle controlling the outlet at the top of said flue and provided with a port opening from the flue; and thermostatically controlled means to control the port, said port being adapted to deliver gasolene and air past said throttle under suction.

17. The combination with a combustion chamber, of a table to deliver fuel and air to said combustion chamber; means to supply fuel and air to said table; a flue leading upward from said table and an inverted downwardly diminishing refractory guard below the table provided with a central bore forming the intake to the flue.

18. The combination with a combustion chamber, of a passage leading to said combustion chamber; a fuel distributor across said passage; means to supply liquid fuel and air to said passage; a flue leading from said combustion chamber; means to supply a limited charge of gasolene to the fuel distributor and thence to the passage and the combustion chamber, and means to ignite the gasolene in the combustion chamber.

19. In a fuel converter the combination with a combustion chamber and means to supply air and fuel to said chamber; of a flue leading from said combustion chamber; a reservoir adapted to contain a charge of gasolene; means adapted to supply a limited charge of gasolene to said reservoir; a stand-pipe in said reservoir provided at the bottom and at the top with orifices; and means leading from the stand-pipe to supply said chamber with gasolene from said reservoir.

20. In a fuel converter the combination with a combustion chamber and a throttled passage, of a passage for fuel and air communicating with said chamber and also communicating with the throttled passage; a flue leading from the combustion chamber; and a by-pass communicating between said air and fuel passage and the combustion chamber to supply the combustion chamber with an additional current of air.

21. In a fuel converter the combination with a combustion chamber, of a throttled passage, a passage for fuel and air communicating with the throttled passage, a flue leading from the combustion chamber, a by-pass communicating between said air and fuel passage and the combustion chamber to supply the combustion chamber with a current of air, and a valve to control said by-pass.

22. A fuel converter for internal combustion engines provided with a combustion chamber and means to supply fuel and air thereto; a flue leading from the combustion chamber and provided with a refractory guard around which the air and fuel are supplied, said guard having an orifice through which the products from the combustion in said chamber are delivered to the flue, and being porous to store liquid fuel for evaporation and ignition to maintain combustion in the combustion chamber when the supply flow of liquid fuel to the combustion chamber is low at low or idling speeds, when the apparatus is not fully heated.

In testimony whereof I have hereunto set my hand at Los Angeles, California, this 22nd day of December, 1917.

ORVILLE H. ENSIGN.

Witness:
JAMES R. TOWNSEND.